United States Patent
Chen et al.

(10) Patent No.: US 7,327,730 B2
(45) Date of Patent: Feb. 5, 2008

(54) DATA PACKET TRANSMISSION METHOD AND NETWORK SWITCH APPLYING SAME THERETO

(75) Inventors: Weipin Chen, Taipei (TW); Perlman Hu, Taipei (TW); Chin-Chang Li, Taipei (TW)

(73) Assignee: VIA Technologies, Taipei (TW)

( * ) Notice: Subject to any disclaimer, the term of this patent is extended or adjusted under 35 U.S.C. 154(b) by 1179 days.

(21) Appl. No.: 10/262,013

(22) Filed: Oct. 1, 2002

(65) Prior Publication Data

US 2003/0142672 A1    Jul. 31, 2003

(30) Foreign Application Priority Data

Jan. 30, 2002    (TW) ................ 91101518 A

(51) Int. Cl.
*H04L 12/28*    (2006.01)
(52) U.S. Cl. ................... 370/390; 370/432
(58) Field of Classification Search ........... 370/390, 370/432
See application file for complete search history.

(56) References Cited

U.S. PATENT DOCUMENTS

| | | | | |
|---|---|---|---|---|
| 5,684,800 A | * | 11/1997 | Dobbins et al. | 370/401 |
| 5,959,989 A | * | 9/1999 | Gleeson et al. | 370/390 |
| 6,181,699 B1 | * | 1/2001 | Crinion et al. | 370/392 |
| 6,625,121 B1 | * | 9/2003 | Lau et al. | 370/230 |
| 6,785,294 B1 | * | 8/2004 | Ammitzbøll et al. | 370/467 |
| 6,947,419 B2 | * | 9/2005 | Liu et al. | 370/390 |
| 2002/0057685 A1 | * | 5/2002 | Ambe et al. | 370/386 |

* cited by examiner

*Primary Examiner*—Wing Chan
*Assistant Examiner*—Anthony Sol
(74) *Attorney, Agent, or Firm*—Volpe and Koenig PC

(57) ABSTRACT

A data packet transmission method for use in a network switch is disclosed. The network switch includes a plurality of connection ports for tranceiving a data packet therefrom, a tag substitution rule table defining a tag substitution rule, a VLAN reference table defining the correlation of a tagging rule with a VLAN information of the data packet, a multicast reference table defining the relationship of a multicast port mask with a multicasting information of the data packet, and a tag determination device. The tag determination device transmits the data packet to destination ports according to the multicast port mask, determines the VLAN tag(s) to be affixed to the data packet for the destination ports according to the tag substitution rule, and optionally removes the VLAN tag for the destination ports according to the tagging rule.

9 Claims, 5 Drawing Sheets

| 1st Port | 2nd Port | 3rd Port | 4th Port |
|---|---|---|---|
| Substitute VID by 10 | Substitute VID by 10 | Substitute VID by 20 | Substitute VID by 20 |

| VLAN ID | VLAN Port Mask | Tagging Rule |
|---|---|---|
| 1 | 11111 | 00000(Rule A) |
| 10 | 11000 | 11000(Rule B) |
| 20 | 00110 | 00100(Rule C) |

Fig.4A

| Destination IP Address | Multicast Port Mask |
|---|---|
| 224.1.1.5 | 11110 |

Fig.4B

| 1st Port | 2nd Port | 3rd Port | 4th Port |
|---|---|---|---|
| Substitute VID by 10 | Substitute VID by 10 | Substitute VID by 20 | Substitute VID by 20 |

Fig.4C

DATA PACKET TRANSMISSION METHOD AND NETWORK SWITCH APPLYING SAME THERETO

FIELD OF THE INVENTION

The present invention relates to a data packet transmission method, and more particular to a data packet transmission method supporting both IP multicasting and virtual local area network (VLAN) functions. The present invention also relates to a network switch to which the data packet transmission method is applied.

BACKGROUND OF THE INVENTION

Multicasting technology is a relative efficient way to transmit multimedia video and audio data in internet or intranet among a designated group of subscribers. The examples to which the multicasting technology is applied include live video conference, web radio, web television, etc. Due to the extremely large quantity of data transmission in multimedia video and audio files, the bandwidth of the entire network is likely to be occupied by the multimedia video and audio data so as to paralyze the network when video and audio casting behavior proceeds in the network. Under this circumstance, an IP multicasting way is preferably performed to accomplish such video and audio casting behavior. The basic rules of the multicasting behavior are generally stipulated in the Internet Group Management Protocol (IGMP) described in the Request for Comment 1112 (RFC 1112). Switch hubs with IGMP functions can directly transmit IP multicasting data to the destination ports while allowing the other ports to share the bandwidth of the network normally. Common switch hubs, however, cannot distinguish the IP multicasting data.

Please refer to FIG. 1 which is a schematic diagram showing a video-on-demand (VOD) network structure capable of supporting IGMP multicasting functions. The backbone router 10 is connected to one or more workstations such as a live information provider 101 and/or a video-on-demand (VOD) server 102. The information can be transferred to the designated group of subscribers who may reside in different countries in the world via the IGMP multicasting technology provided the switch hubs with IGMP functions are used. It is assumed that the designated group of subscribers sharing the VOD server 102 include subscribers 111 and 112 connected to the first switch hub 11, a subscriber 121 connected to the second switch hub 12, and a subscriber 133 connected to the third switch hub 13, with a multicast group ID 224. 1. 1. 5. When the switch hubs 11, 12 and 13 receive an external packet, a so-called snooping operation is performed to correlate the destination IP address of the received packet with the IP multicast table built in each of the switch hubs in order to find out a port mask for the subsequent data transmission. For example, when the first switch hub 11 having eight ports receives a packet from the VOD server 102, a look-up-table operation is performed according to the destination IP address, i.e. 224. 1. 1. 5. From the information in the table, it is generated that only the subscribers 111 and 112 are the subscribers of the VOD server 102. Therefore, the resulting port mask is 11000000. The packet from the VOD server 102 can be outputted to the first and the second ports corresponding to the subscribers 111 and 112 only, thereby accomplishing the multicasting operation.

A virtual local area network (VLAN), on the other hand, is a network technology developed for the network security issue. In the VLAN technology, some subscribers are grouped to form an isolated broadcast domain. The broadcasting or group casting information packets from any of the workstations in the VLAN will be sent to the VLAN members only. By using network management software, it is possible to divide the subscribers of the same physical broadcast domain into several logical broadcast domains, or logically group the subscribers of different physical broadcast domains into the same broadcast domain. The VLAN technology allows the subscribers under the same Ethernet structure to keep privacy and network security, and the subscribers residing at different locations to be linked together. The virtual feature results in good flexibility.

The VLAN units can be ports or multimedia access controller (MAC) addresses. For the MAC-based VLAN, the transmission path of the data packets is determined according to a VLAN table correlating VLAN ID or VID stored in the switch hub. Please refer to FIG. 2 that schematically shows a partial format of a data packet wherein a VLAN tag is specified. The 4-byteVLAN tag between the source MAC (SMAC) address and the Ethernet type includes a VLAN ID or VID of 12 bits.

In order to support the VLAN functions, many newly developed network cards recognize VLAN tags, and are called VLAN cards hereinafter. The VLAN cards, however, do not accept the data packet without the VLAN tag. In other words, for the VOD network structure supporting IGMP multicasting functions as shown in FIG. 1, the multicasted data packets from the IGMP switch hubs will be discarded by the VLAN cards when some subscribers use VLAN cards. Accordingly, the data transmission cannot be accomplished.

SUMMARY OF THE INVENTION

Therefore, an object of the present invention is to provide a data packet transmission method that supports both IP multicasting and virtual local area network (VLAN) functions.

A first aspect of the present invention relates to a data packet transmission method for use in a network switch having a plurality of connection ports. The method includes steps of receiving a data packet; generating a multicast port mask in response to a multicasting information of the data packet; and transmitting the data packet to destination ports according to the multicast port mask, and optionally affixing a VLAN tag to the data packet according to a tagging rule and a tag substitution rule in a cross-enabling condition.

In accordance with the present invention, the multicast port mask is generated by looking up a multicasting reference table in the network switch according to a destination address of the data packet. The multicasting reference table is an IP multicast table. The destination address can be a destination MAC (DMAC) address or a destination IP address.

Preferably, the method further comprises steps of generating a VLAN port mask in response to a VLAN information of the data packet; generating an intersection port mask according to the multicast port mask and the VLAN port mask; and transmitting the data packet to destination ports according to the intersection port mask, and optionally affixing a VLAN tag to the data packet according to the tagging rule in a cross-disabling condition.

In accordance with the present invention, the VLAN port mask and the tagging rule is generated by looking up a VLAN reference table in the network switch according to a VLAN ID of the data packet.

A second aspect of the present invention relates to a data packet transmission method for use in a network switch having a plurality of connection ports. The method includes steps of receiving a data packet; generating a multicast port mask in response to a multicasting information of the data packet; and transmitting the data packet to destination ports according to the multicast port mask. A VLAN tag is selectively affixed to the data packet according to a first tagging rule.

Preferably, the method further comprises steps of generating a second tagging rule in response to the value of the VLAN tag; and optionally removing the VLAN tag from said data packet according to the second tagging rule.

More preferably, the method further comprises steps of generating a VLAN port mask in response to the value of the VLAN tag; and generating an intersection port mask according to the multicast port mask and the VLAN port mask, wherein the data packet is transmitted to destination ports according to the intersection port mask, and the VLAN tag is affixed to the data packet according to the second tagging rule when a cross-disabling flag of the network switch rises.

A third aspect of the present invention relates to a network switch. The network switch includes a plurality of connection ports for tranceiving a data packet therefrom; a tag substitution rule table defining a tag substitution rule; a VLAN reference table defining the correlation of a tagging rule with a VLAN information of the data packet; a multicast reference table defining the correlation of a multicast port mask with a multicasting information of the data packet; and a tag determination device optionally affixing a VLAN tag to the data packet according to the tag substitution rule and the tagging rule by looking up the VLAN reference table and the multicast reference table when the data packet is tranceived through destination ports according to the multicast port mask.

Preferably, the multicasting information is a destination address of the data packet, and the VLAN information is a VLAN ID.

For example, the multicasting reference table is an IP multicast table, and the destination address is a destination MAC (DMAC) address or a destination IP address.

Preferably, the network switch further comprises a cross-disabling flag that rises to determine destination ports for the data packet therefrom according to an intersection port mask of the multicast port mask and the VLAN port mask, and affix a VLAN tag to the data packet according to the tagging rule.

BRIEF DESCRIPTION OF THE DRAWINGS

The present invention may best be understood through the following description with reference to the accompanying drawings, in which:

FIG. 4A is a schematic diagram showing an exemplified VLAN table included in a network switch of the present invention;

FIG. 4B is a schematic diagram showing an exemplified IP multicast table included in a network switch of the present invention;

FIG. 4C is a schematic diagram showing an exemplified tag substitution table included in a network switch of the present invention.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
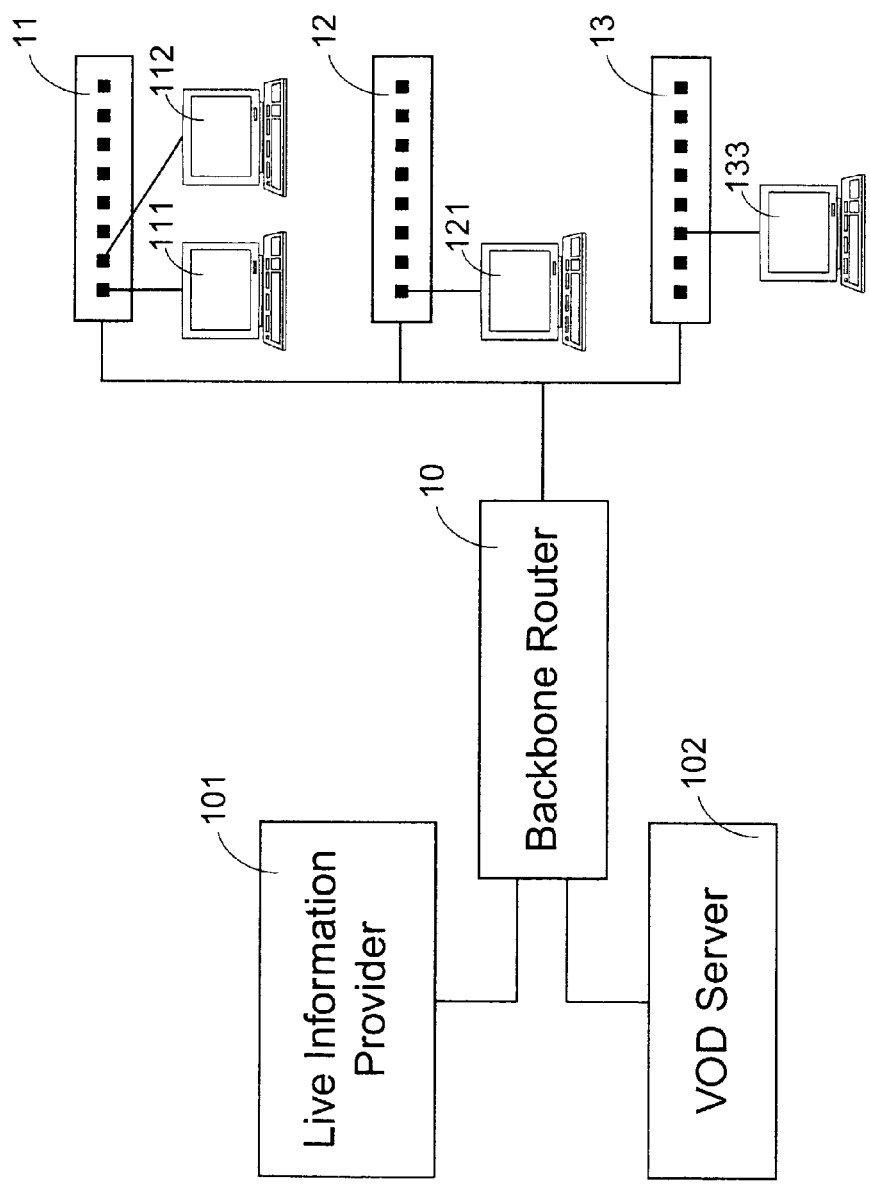
FIG. 1 is a schematic diagram showing a VOD network structure supporting IGMP multicasting functions.
Figure 2:
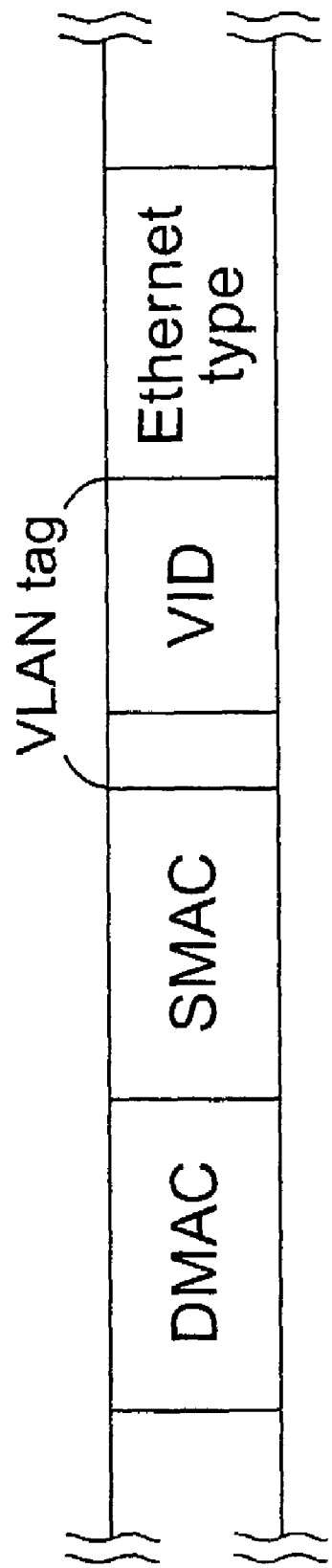
FIG. 2 is a schematic diagram showing a part of a data packet with a VLAN tag.
Figure 3:
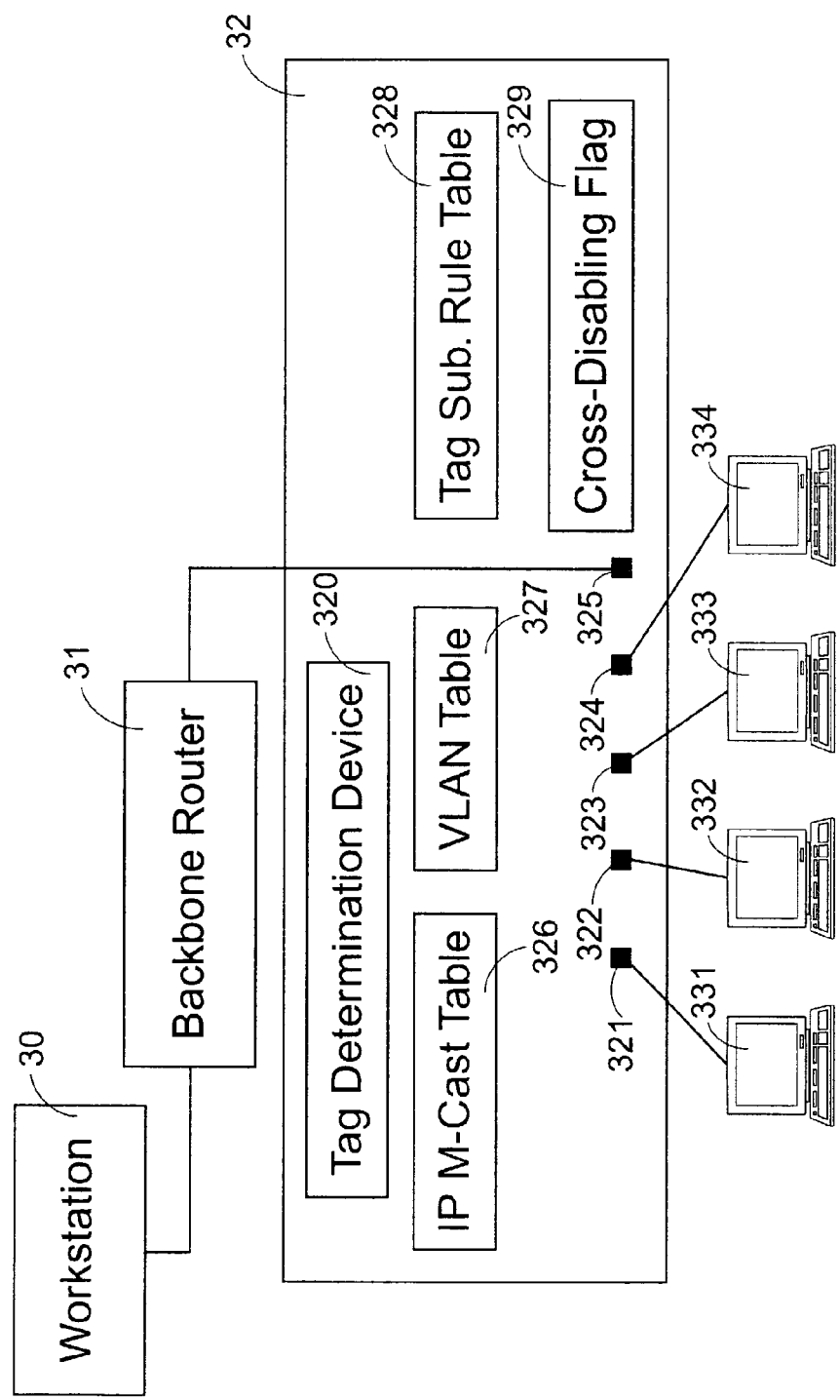
FIG. 3 is a schematic diagram showing a VOD network structure supporting both IGMP multicasting and VLAN functions.
Figure 5:
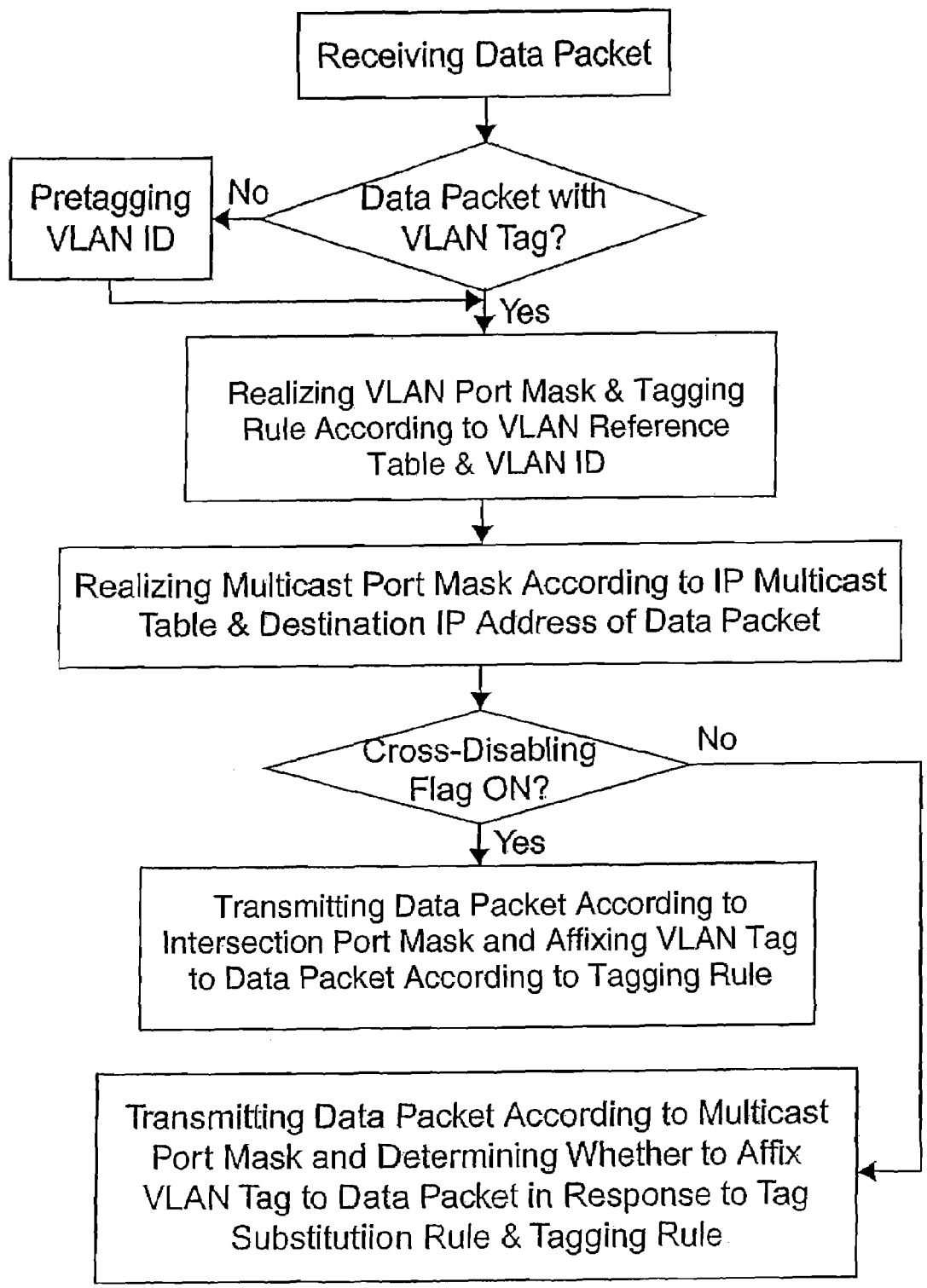
FIG. 5 is a flowchart schematically illustrating the data packet transmission method for use in a network switch according to the present invention.

Please refer to FIG. 3 which is a schematic diagram showing a VOD network structure supporting both IGMP multicasting and VLAN functions. The workstation 30 transmits IGMP multicasting data to the uplink port, i.e. the fifth connection port 325, of the switch hub 32 via the backbone router 31. The switch hub 32 further includes first, second, third and fourth connection ports 321, 322, 323 and 324 in communication with subscribers 331, 332, 333 and 334, respectively, who all belong to the same cyber group of the workstation 30, an IP multicast table 326, a VLAN table 327, a tag substitution rule table 328, a cross-disabling flag 329 and a tag determination device 320. The data transmission method will be described hereinafter with reference to the flowchart of FIG. 5, and exemplified with reference to the tables of FIGS. 4A~4C. It is assumed that the subscribers 331, 332 and 333 have VLAN cards and only receive tagged packets while the subscriber 334 does not have a VLAN card and only receive untagged packets.

When the switch hub 32 receives a data packet, whether the data packet has a VLAN tag or not is checked. When the data packet bears a VLAN tag, for example of a VID value 10, a VLAN port mask "11000" and a tagging rule B "11000" are applied according to the VLAN table 327 illustrated in FIG. 4A, and the cross-disabling flag 329 rises (ON). In this cross-disabling condition, the connection ports that will receive the data packet are determined by the intersection port mask of the VLAN port mask and a multicast port mask. The multicast port mask is generated by looking up the IP multicast table 326 according to a destination IP address. In the example shown in FIG. 4B, the multicast port mask is "11110" for the destination IP address of "224. 1. 1. 5". Therefore, the intersection port mask will be "11000", which indicates that the data packet is only provided for the subscribers 331 and 332. Referring to FIG. 4A again, the tagging rule B "11000" indicates that the VID value 10 is present in the data packet transmitted to both of the first and second subscribers 331 and 332 who as have been known, have VLAN cards and only receive tagged packets.

In another example, the data packet is received with a VLAN tag of a VID 20, and the cross-disabling flag 329 rises (ON). It indicates that the data packet is to be transmitted to the third and the fourth subscribers 333 and 334 via the ports 323 and 324, respectively, according to the VLAN table of FIG. 4A and the IP multicast table of FIG. 4B. In this case, the tagging rule C "00100" is applied. According to the tagging rule C, the VID value 20 is present in the data packet transmitted to the subscriber 333 via the port 323, but removed from the data packet transmitted to the subscriber 334 via the port 324. By this way, the subscriber 333 has a VLAN cards will receive a tagged data packet while the subscriber 334 has no VLAN cards will receive an untagged data packet.

In a further example, the received data packet does not bear any VLAN tag. Therefore, a preset VLAN ID or VID is first affixed to the data packet. For example, referring to FIG. 4A, a preset VID value 1 is affixed to the data packet to realize a VLAN port mask "11111" and a tagging rule A "00000" according to the VLAN table 327. The bit data "11111" of the VLAN port mask indicates that all the ports 321, 322, 323, 324 and 325 will be grouped as the same VLAN domain, and the bit data "00000" of the rule A indicates that the data packet is untagged, i.e. not affixed thereto the VID value, for all the connection ports. According to an embodiment of the present invention, the connection ports that will receive the data packet are determined according to a multicast port mask unless the cross-disabling flag 329 rises. The multicast port mask is generated by looking up the IP multicast table 326 of FIG. 4B according to the destination IP address. In other words, in a cross-enabling mode, the broadcasting ports will be the first to the fourth connection ports 321, 322, 323 and 324 under the destination IP address of "224. 1. 1. 5". Since the data packet to be received and transmitted via each of the connection ports 321, 322, 323 and 324 does not include any VID, it is processed by the tag determination device 320 to optionally affix a VID thereto according to a tag substitution rule table 328. As shown in FIG. 4C, the data packet is substituted by one with a VID value 10 for each of the first and second connection ports 321 and 322, and by one with a VID value 20 for each of the third and fourth connection ports 323 and 324. According to the VLAN table of FIG. 4A, the tagging rule B is applied to the data packet through the first and the second connection ports with the VID value 10, and the tagging rule C is applied to the data packet through the third and the fourth connection ports with the VID value 20. According to the tagging rule B, the VID value 10 is present in the data packet transmitted to both of the first and second subscribers 331 and 332. According to the tagging rule C, the VID value 20 is present in the data packet transmitted to the subscriber 333 via the port 323, but removed from the data packet transmitted to the subscriber 334 via the port 324. By this way, the subscribers 331, 332 and 333 has VLAN cards will receive tagged data packets while the subscriber 334 has no VLAN cards will receive an untagged data packet. Accordingly, the present network switch can support both IP multicasting and virtual local area network (VLAN) functions, and the problem encountered by the prior art can be solved.

It is to be noted that the cross-disabling flag 329 can be forced to rise if required by a network manager. Then, the data packet will be transmitted according to the intersection port mask and tagged according to the tagging rule without involving the tag substitution rule.

In general, IGMP multicast data packets do not bear any VLAN tag. Therefore, the present invention can process such packets according to the third example mentioned above to allow all the desired subscribers of the same VLAN domain to receive correct data by selectively affixing VLAN tags. In addition to the presence of the VLAN tag, a multicast data packet can be determined via the destination MAC (DMAC) address. For example, the DMAC address starting with "01005E" inherently indicates that the data packet is a multicast data packet. Therefore, it is preferred that the cross-enabling mode is applied.

To sum up, the present switch hub allows the VLAN card users in the network with IGMP multicasting functions. The multicast data packets can be safely received by both kinds of the subscribers with or without VLAN cards.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A network switch, comprising:
 a plurality of connection ports for transceiving a data packet therefrom;
 a tag substitution rule table defining a tag substitution rule;
 a VLAN reference table defining the correlation of a tagging rule with a VLAN information of said data packet;
 an IP multicast table defining a relationship of a multicast port mask with a multicasting information of said data packet;
 a tag determination device optionally affixing a VLAN tag to said data packet, optionally replacing said VLAN tag, and optionally removing said VLAN tag from said data packet according to said tag substitution rule and said tagging rule by looking up said VLAN reference table and said IP multicast table; and
 a cross-disabling flag, wherein when said cross-disabling flag is preset ON, destination ports where said data packet is to be sent are determined according to an intersection port mask common to said multicast port mask and said VLAN port mask, and a VLAN tag is optionally affixed to or removed from said data packet according to said tagging rule.

2. The network switch according to claim 1 wherein said multicasting information is a destination address of said data packet, and said VLAN information is a VLAN ID.

3. The network switch according to claim 1 wherein when said cross-disabling flag is preset OFF, destination ports where said data packet is to be sent are determined according to said multicast port mask, and a VLAN tag is optionally affixed to or removed from said data packet according to said tag substitution rule and said tagging rule.

4. A data packet transmission method for use in a network switch having a plurality of connection ports, comprising steps of:
 receiving a VLAN-untagged multicast data packet and tagging said data packet with a preset VLAN tag;
 looking up an IP multicast table associated with a multicasting information of said data packet to acquire a multicast port mask, which is indicative of destination ports where said data packet is to be sent, in a cross-enabling condition;
 looking up a tag substitution rule table associated with said multicast port mask to acquire substitute VLAN tags respectively for said destination ports to replace said preset VLAN tag;
 looking up a VLAN reference table associated with said substitute VLAN tags to determine whether there is any VLAN tag for any destination port required to be removed; and
 transmitting said data packet to said destination ports with or without said substitute VLAN tags according to a tagging rule included in said VLAN reference table.

5. The method according to claim 4 further comprising steps of:
- looking up a VLAN reference table associated with said preset VLAN tag of said data packet to acquire a VLAN port mask, and acquiring an intersection port mask, which is common to both said multicast port mask and said VLAN port mask and indicative of destination ports where said data packet is to be sent, in a cross-disabling condition; and
- transmitting said data packet to said destination ports in said cross-disabling condition with or without said preset VLAN tag according to a tagging rule included in said VLAN reference table associated with said preset VLAN tag.

6. The method according to claim 4 further comprising steps of:
- exempting from tagging said data packet with said preset VLAN tag if a data packet with an existing VLAN tag is received;
- looking up a VLAN reference table associated with said existing VLAN tag to acquire a VLAN port mask, which is indicative of destination ports where said data packet with said existing VLAN tag is to be sent, and to determine whether there is any VLAN tag for any destination port required to be removed; and
- optionally removing said existing VLAN tag from said data packet according to a tagging rule included in said VLAN reference table associated with said existing VLAN tag before transmitting said data packet.

7. The method according to claim 4 wherein said multicasting information of said data packet is a destination MAC (DMAC) address.

8. The method according to claim 4 wherein said multicasting information of said data packet is a destination IP address.

9. The method according to claim 4 wherein a VLAN ID included in said preset VLAN tag is replaced with different substitute VLAN IDs recorded in said tag substitution rule table to acquire said substitute VLAN tags, and said VLAN reference table is looked up according to said substitute VLAN IDs respectively included in said substitute VLAN tags.

\* \* \* \* \*